United States Patent [19]
Rosenthal

[11] Patent Number: 5,857,344
[45] Date of Patent: *Jan. 12, 1999

[54] ATMOSPHERIC WATER EXTRACTOR AND METHOD

[76] Inventor: Richard A. Rosenthal, 879 Redbird Dr., San Jose, Calif. 95125

[*] Notice: The term of this patent shall not extend beyond the expiration date of Pat. No. 5,636,521.

[21] Appl. No.: 823,148

[22] Filed: Mar. 25, 1997

Related U.S. Application Data

[63] Continuation-in-part of Ser. No. 288,570, Aug. 10, 1994, Pat. No. 5,636,521.
[51] Int. Cl.$^6$ .............................. F25D 17/06; F25B 5/00
[52] U.S. Cl. .................................. 62/93; 62/117; 62/498
[58] Field of Search ....................... 62/117, 527, 498.93, 62/DIG. 2

[56] References Cited

U.S. PATENT DOCUMENTS 5,636,521  6/1997  Rosenthal .................................. 62/117

Primary Examiner—William E. Wayner
Attorney, Agent, or Firm—Walter A. Hackler

[57] ABSTRACT

Atmospheric water extractor apparatus and method including a compressor an evaporator and one or more removable reservoirs for collecting drinkable water that has condensed on the evaporator.

First and second chambers are provided separated by free-floating piston for alternately condensing refrigerant gas in the first chamber and storing refrigerant liquid in the second chamber, and condensing refrigerant gas in the second chamber, and storing refrigerant liquid in the first chamber. Lines inter-connecting the compressor, evaporator, condenser and the first and second chambers of the gas piston cylinder enable the compressor to alternately introduce refrigerant gas into the first chamber and move refrigerant liquid into the evaporative means by displacement of the free-floating piston and introduce refrigerant gas into the second chamber and move refrigerant liquid into the evaporator by first displacement of the free-floating piston.

13 Claims, 1 Drawing Sheet

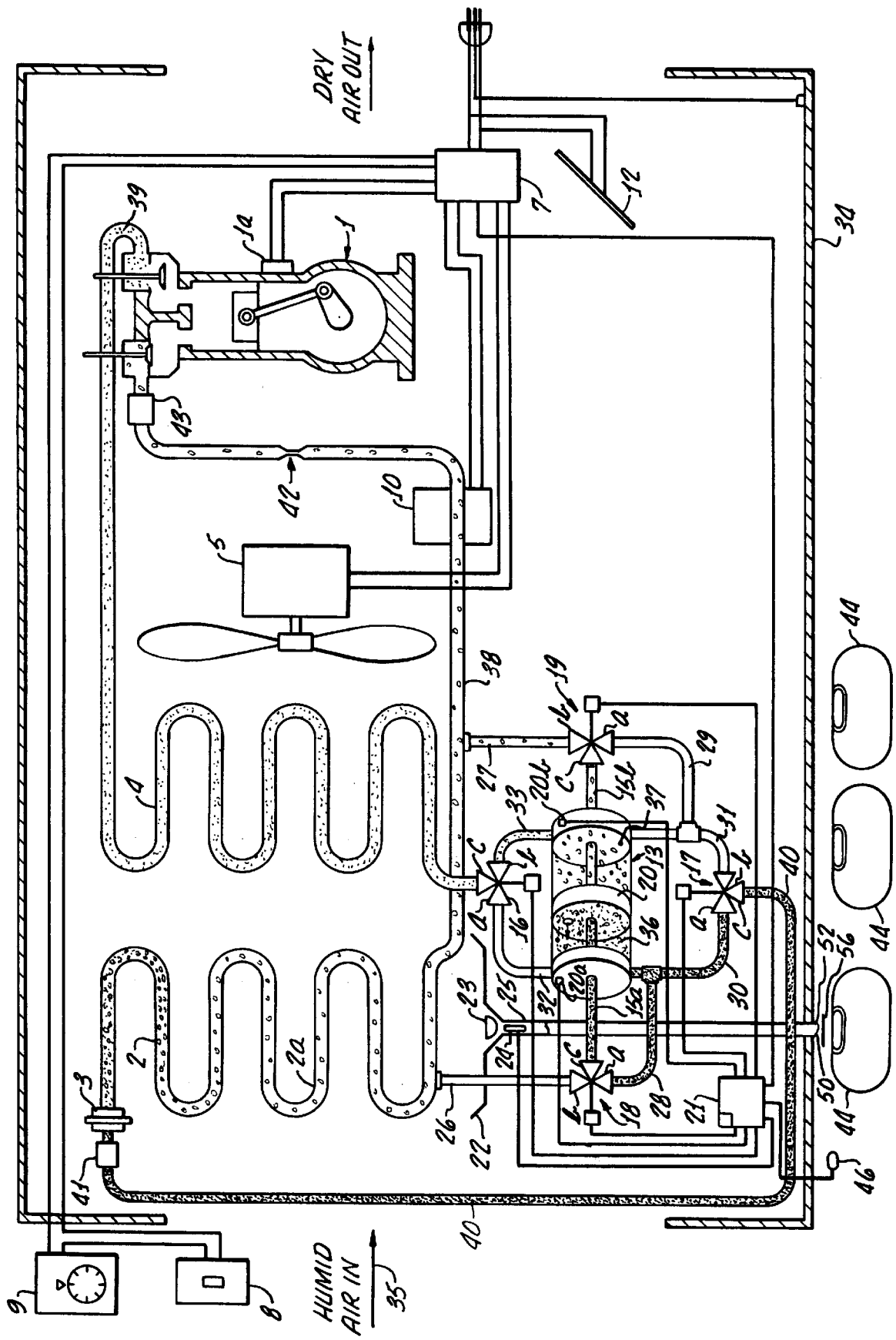

ATMOSPHERIC WATER EXTRACTOR AND METHOD

The present application is a continuation-in-part of U.S. patent application Ser. No. 08/288,570, filed on Aug. 10, 1994, now U.S. Pat. No. 5,636,521.

The present invention is generally directed to refrigeration apparatus useful for the efficient extraction of water from an ambient atmosphere and more particularly directed to a portable water generator system.

Potable liquid water is commonly taken for granted by persons in modern developed societies. Often, only when a person is removed from a seemingly endless supply of fresh potable water, will the need for such water be appreciated. For example, experienced outdoorsmen realize that even in the midst of clear running streams and abundant lakes, potable water is something that typically must originate from the faucet or grocery store, as it has been confirmed that untreated water flowing in the natural waterways is generally not safe for human consumption.

Water is cumbersome to manually transport, thus limiting the distance a backpacker or camper may travel from a source of drinking water, as well limiting an amount of time spent in the backcountry.

In addition, water is bulky to store. Persons inhabiting areas where a water supply is not reliable, such as, for example, persons living in earthquake prone regions, are advised to store bottled water in case the municipal supply becomes disconnected. Families are advised to store, at all times, a minimum of one gallon of water per person per day, for a three day supply, in case of an emergency. Many people do not heed this advise, in part due to the substantial amount of storage space such a supply may require.

Various products exist on the market which claim to enable a person to purify water of questionable safety. For example, water treatment kits are currently being marketed which offer a means for treating stream or lake water with filters and/or chemicals in order to make such water drinkable, but the effectiveness of such devices is questionable. These purifying devices generally operate by destroying the bacteria known as Giardia, which is believed to infect most, if not all, of the natural waterways, and is known to cause serious illness if ingested. Such devices must be used with caution, as numerous other, lesser known and understood bacteria and viruses invade the waterways, which may be unaffected by such purifying devices.

The present invention solves the problems discussed above regarding access to potable water by providing a portable device which effectively extracts clean, drinkable water from a surrounding atmosphere.

The present invention relies on the basic principles of refrigeration, which are derived from the behavior of a suitable fluid when it changes its state from liquid to gas or from gas to liquid.

Compressing a gas causes its temperature to rise, and if its temperature is then reduced without reducing the pressure, the gas will liquify. On the other hand, reducing the pressure of liquified gas will make it vaporize, i.e., boil.

The usefulness of these effects to refrigeration lies in the fact that any changes of a fluid between its liquid and gaseous states requires the transfer of latent heat to or from the fluid. In the case of the change from liquid to gas, latent heat must be supplied in order to provide the necessary energy for the change, and when the gas is liquified, this latent energy is released.

A refrigeration cycle may be defined as any system that takes heat at a lower temperature and rejects it at a higher temperature. In such a refrigeration system, the working fluid, or refrigerant, is evaporated in the evaporator and latent heat is drawn from the atmosphere ambient to the evaporator. Refrigerant then passes through a condenser unit spaced apart from the evaporator where it is condensed back to a liquid. Condensing the refrigerant releases its latent heat, which is the heat it absorbed in the evaporator, and so as the cycle continues, the refrigerant removes heat from the atmosphere ambient the evaporator and releases it from the condenser to the surrounding atmosphere.

The present invention enables the collection of water from the atmosphere. Refrigeration apparatus causes condensation to accumulate on the surface of an evaporator which also serves as a precipitator as the surrounding air is lowered below its dew point temperature. Accumulated moisture may thereafter be utilized for life support.

More particularly, the present invention includes a hydraulic refrigeration cycle in which heat is absorbed from an evaporator, except that high pressure vapor from the condenser is introduced against the face of a free-floating gas piston inside a hermetically sealed gas piston solenoid. The pressure of the gas exerted against the piston confines the liquid refrigerant on the opposite side of the piston to liquid phase.

When all the liquid refrigerant has been introduced into the evaporator, the piston reverses itself and the cycle is repeated. A portion of the refrigerant in the liquid phase is always introduced into the interior of a hollow piston via a hollow shaft on both sides of the piston where it is throttled from the liquid to the gaseous phase via an expansion valve.

This latent heat vaporization supercools the refrigerant inside the gas piston thereby reducing the temperature, heat of the compression, of the gas exposed to the compression side of the compressor. The lower temperature compounded with limiting the critical volume of the refrigerant in the liquid phase substantially reduces the energy input to the compressor by up to thirty percent.

As the evaporator absorbs heat from the atmosphere, water droplets extracted therefrom are condensed on coils of the evaporator. These droplets accumulate and fall into a portable reservoir. The water accumulated in the reservoir may then be immediately consumed or stored for later use.

SUMMARY OF THE INVENTION

Atmospheric water extractor apparatus in accordance with the present invention generally includes compressor means for compressing a refrigerant gas to a liquid and evaporator means for evaporating refrigerant liquid to refrigerant gas and cooling an atmosphere adjacent the evaporative means. Condensing means are provided for the partial rejection of the heat of compression of the hot refrigerant in the vapor phase to the atmosphere.

Chamber means are provided which include a free-floating hollow piston separating the chamber means into a first and a second chamber as provided, for alternately a) condensing refrigerant gas in the first chamber and storing refrigerant liquid in the second chamber, and b) condensing refrigerant gas in the second chamber and storing refrigerant liquid in the first chamber.

Additionally, means are provided which include lines interconnecting the compressor means, the evaporator means, the condensing means, and the first and second chambers for enabling the compressor means to alternately a) induce refrigerant gas into the first chamber and move refrigerant liquid into the evaporative means by displacement of the free-floating piston, and b) introduce refrigerant gas into the second chamber and move refrigerant liquid into the evaporator means by reverse displacement of the free-floating piston.

The free-floating piston means may include expansion valve means for throttling a liquid refrigerant into the hollow piston in order to super-cool the piston.

More particularly, the present invention may include means for cooling the chamber means and specifically the means for cooling the chamber means may include a fan for passing the cooled atmosphere adjacent the evaporative means over the compressor and chamber means.

In addition, means are provided for collecting water condensing on the evaporator means from the adjacent atmosphere. The means for collecting may include at least one reservoir, removably attached to the apparatus, and a drain line disposed between the evaporator and the reservoir.

A plurality of reservoirs may be provided such that after a single reservoir has been filled, it may be removed from the apparatus and a second reservoir may be attached in its place for filling. This enables a user to keep the apparatus running continuously, extracting as much water as is necessary.

Furthermore, the present invention may include means for conditioning the water entering the reservoir by addition of additives thereto, such as carbon dioxide gas or essential minerals.

Finally, a sensor may be included in order to provide means for detecting a minimal water level in the reservoir, such that the apparatus will be automatically turned off when the reservoir has been filled to a desired minimal level.

The advantages of the present invention lie in the fact that the latent heat vaporization of a refrigerant gas is most effectively utilized by using the gas piston cylinder, or the chamber means, as a liquid receiver and secondary condenser and the evaporator as the precipitator.

Preferably, in view of environmental concerns, the present invention utilizes propane for the refrigerant gas since the environmental effects of this hydrocarbon are negligible inasmuch as the gas is not classified as a toxic chlorofluorocarbon.

A method of water extraction in accordance with the present invention generally includes the steps of compressing refrigerant gas to a liquid and introducing the liquid into a first sealed chamber having as one wall thereof a hollow movable piston in order to compress the refrigerant gas in a second sealed chamber by movement of the movable piston. Refrigerant gas compressed in the second chamber is withdrawn and introduced into an evaporator in order to vaporize the refrigerant.

The vaporized refrigerant is introduced into the second chamber.

Thereafter, the method of the present invention comprises compressing the refrigerant gas from the condenser to a liquid and introducing the liquid refrigerant gas into the second sealed chamber in order to compress the refrigerant gas in the first sealed chamber by movement of the movable piston. Next, cooled air is passed over the first and second chambers, and water condensing on the evaporator is collected from the adjacent atmosphere into a removable reservoir.

BRIEF DESCRIPTION OF THE DRAWINGS

The present invention can be more easily understood by consideration of the following detailed description, particularly in conjunction with the accompanying drawing in which:

FIG. 1 is an engineering diagram of atmospheric water extractor apparatus in accordance with the present invention suitable for performing the method of the present invention.

DETAILED DESCRIPTION

Turning now to FIG. 1, there is generally shown refrigeration apparatus and water extractor in accordance with the present invention, generally including a motor-driven compressor 1 which provides a means for compressing a refrigerant gas into a liquid and an evaporator 2 which provides means for evaporating refrigerant liquid into a refrigerant gas and cooling an atmosphere 35 adjacent to the evaporator 2.

Chamber means 13 is provided which includes a free-floating piston 20, with integral hollow shafts 15a, 15b, separating the chamber means 13 into a first sealed chamber 36 and a second sealed chamber 37. As hereinafter discussed in greater detail, the free-floating piston 20 provides a means for alternately condensing the refrigerator gas in the first chamber 36 and storing liquid refrigerant in the second chamber 37 and thereafter condensing refrigerant gas in the second chamber 37 and storing refrigerant liquid in the first chamber 36.

A low pressure vapor line 38 interconnects the evaporator 2 and the compressor 1. Output from the compressor 1 is introduced via a high pressure line 39 into the condenser 4. Thereafter, liquid refrigerant from the condenser 4 is alternatively delivered through solenoid valve 16 and line 32 to the first chamber 36 or to the second chamber 37 through line 33 respectively.

The first chamber 36 is interconnected via line 30 through solenoid valve 17 and liquid line 40 to expansion valve 3. The second chamber 37 is also interconnected via line 31 to the liquid line 40 through solenoid valve 17. The floating piston 20 is hollow and includes natural expansion valves because of the dramatic difference between the hollow shafts 15a, 15b and the hollow piston 20 as represented in FIG. 1. This provides means for throttling liquid refrigerant into the hollow piston 20. Movement of the hollow piston 20 and integral hollow shafts 15a, 15b within the chamber means 13 is enabled via flexible high pressure lines 28 and 29 connected thereto. Solenoid valves 18 and 19 respectively, control flow through the flexible high pressure lines 28, 29 and integral hollow piston shafts in order to supercool the piston 20. The low pressure vapor from the hollow piston shafts 15a and 15b is conducted through lines 26 and 27 via solenoid valves 18 and 19 to the evaporator 2 which includes a plurality of coils 2a. A motor-driven fan 5 is used to circulate air past the evaporator 2.

Filters 41, 43 are disposed in liquid line 40 and in vapor line 38 respectively in a conventional manner along with a pressure regulator 42. Each of the solenoid valves 16, 17, 18, 19 includes valves 16a, 16b, 16c, 17a, 17b, 17c, respectively, which along with valves 18a, 18b, 18c, 19a, 19b, 19c control the flow of the liquid refrigerant and gas in accordance with the present invention, with such a control system 21 being of modern computer design and made in accordance to fulfill the steps of the present invention.

An accumulator (water drain) 22, disposed adjacent the evaporator 2, and at least one reservoir 44 provide means for collecting water condensing on the evaporator 2. The means for collecting water may also include drain line 25 connected to the accumulator 22 and disposed between the evaporator 2 and reservoir 44. The reservoir 44 may have, for example, approximately a two gallon capacity, or substantially less capacity when the apparatus is being used as a portable facility.

The drain line 25 may include a circular, or sloped annulus 50 on an end 52 thereof, which provides means for directing the condensed water into the reservoir 44 in order to prevent excess evaporation and leakage of the water. In particular, the sloped annulus 50 directs and focuses the dripping or flowing water, rather than allowing the water to drip from random points along the drain line end 52.

Preferably, the reservoir 44 is removably attached to an exterior housing 34 of the apparatus. Thus, when the reservoir 44 has been filled to capacity or to a desired level, it may be removed and transported or stored for later use. The attachment may be of any conventional means, such as snap or screw fitting engagement or the like.

In one embodiment of the present invention, a plurality of reservoirs 44 may be provided. Thus, immediately after filling and removing a first reservoir, a second reservoir may be attached to the apparatus in place of the first. This enables the apparatus to be operated continuously, filling as many reservoirs as desired by the user.

In order to prevent the removable reservoir 44 from detaching from the housing due to the weight of water therein, an optional reservoir support, or stand (not shown) may be provided.

In addition, a sensor 46 may be provided, which provides means for detecting when the reservoir 44 is full. More particularly, a photoelectric sensor 46, disposed adjacent the reservoir 44, may be used for detecting when water in the reservoir 44 has reached a certain minimal level, and at such a point in time, the apparatus will be turned off via the microcontroller 21. Alternatively, solenoid valves (not shown) disposed in the water drain line 25 and operating in cooperation with the sensor, may provide means for stopping the flow of water into the reservoir 44.

Another feature of the present invention is a water conditioner 56, which provides means for conditioning the water entering the reservoir by addition of at least one additive thereto. The water conditioner 56 may include a plurality of additives, for example, carbon dioxide gas, essential minerals and vitamins. Preferably, means for enabling manual selection of one or more additives is included.

As shown in the Figure, lines 30, 31, 32 33 directly connected to the chambers 36, 37 respectively, are interconnected to the compressor 1 and evaporator via solenoid valves 16, 17, 18, 19. In operation, liquid refrigerant under high pressure flows from the first chamber 36 through solenoid valve ports 17a, c via line 30 and into the liquid line 40 via filter drier 41 to the expansion valve 3 and into the evaporator 2.

Here, the pressure is greatly reduced and the liquid refrigerant boils and absorbs heat from the evaporator. A portion of the refrigerant in the liquid phase is simultaneously introduced into the interior of the hollow shaft 15a and piston 14, via lines 30 and 28 through solenoid valve ports 18a, c. Inside the piston 20, the pressure is greatly reduced, the refrigerant boils and absorbs heat from the refrigerant in the liquid phase in the first chamber 36, supercooling it; while significant heat is simultaneously absorbed from the hot, compressed refrigerant vapor in the second chamber 37 of the chamber means 13. The refrigerant, now a vapor, exits through the hollow shaft 15b and returns to the suction line 38 to the compressor 1, through solenoid valve ports 19c, b and line 27. At this point, the refrigerant vapor in the second chamber 37 undergoes a phase change to the liquid phase. The critical volume of the second chamber 37 always inhibits the refrigerant from returning to the vapor phase by virtue of the piston 20 and its temperature.

Now, a low pressure refrigerant flows back to the compressor 1 through the line 38 and is compressed to the high pressure vapor with a greatly increased temperature.

When the gas piston 20 has traversed the length of the chamber means 13, the liquid refrigerant in the second chamber 37 is recirculated back to the evaporator 2 via solenoid valve ports 17b, c and the cooling cycle is repeated. The cooling cycle is reversed when the contacts 20c and 20d on the front and rear surfaces of the piston 20 trigger either magnetic switch 20a or 20b in the first 36, or second 37, chamber of the gas piston cylinder means 13. Contact closures are sensed and acted upon by the microcontroller system 21 which activates or deactivates the appropriate solenoid valves 16, 17, 18, 19. System power is engaged by switch 8; humidity control 9, air flow, frost control 10, and motor control 7 functions are sensed and acted upon by the microcontroller system 21 for processing this information to monitor and control the atmospheric water extractor.

When operated as hereinabove described, the evaporator 2, along with the water drain (accumulator) 22, ultraviolet lamp 24, water filter 23, water conditioner 56, and reservoir 44 provides potable water.

For facilitating travel with the water extractor apparatus, the apparatus may be built as a portable facility. A miniaturized compressor 1 may be driven by a motor 1a which may be fueled by propane or electrically driven, such as, for example, a solar array 12. The reservoir 44 may be substantially less than two gallon capacity, such that a filled reservoir can be removed from the balance of the apparatus and manually transported by an individual user.

Calculations have shown that propane is a suitable refrigerant gas while newly-developed replacements for freon refrigerants, such as those developed by Dupont, may also be utilized.

Regarding the use of the apparatus as a gaseous atmospheric water extractor utilizing propane, it has been found that to remove 6 ounces of moisture/hour from the atmosphere at 70° F. and 40% relative humidity at a flow rate of 200 CFM, a sensible heat of 5940 BTU/hour and a latent heat of 3762 BTU/hour, or 9612 BTU/hour must be removed. The normalized latent heat of vaporization for propane is 160 BTU/hour. The heat of compression is 04 BTU/hour. Therefore, to extract 6 ounces/hour, a ¼ HP motor is required. To accomplish this, an input of 2,360,000 BTU/hour is required to power the compressor. A 4.2 ft. by 4.2 ft. solar cell array is used to generate the necessary 688 KW/hour to power the 24 VDC at 8 Amp motor to recompress the liquified propane 72,000 times/hour. The critical volume of propane at standard temperature and pressure is 8.5 cu. ft./lb.

The range of atmospheric conditions for which the present apparatus is operable is any point above freezing at a relative humidity (RH) of not less than 10%. The higher the ambient temperature and RH, the more moisture can be extracted. Doubling the flow rate doubles the amount of moisture extracted, which doubles the amount of energy required. This required energy is minimized by re-using the cold, dry dehumidified air from the evaporator to partially cool the condenser 4, gas piston cylinder 14, compressor 1, and motor 1a by a counter-current heat exchange initiated by the evaporator 2.

Propane as the working fluid is preferred since it represents the best compromise between impact on the environment, availability, cost, toxicity, latent heat of vaporization, critical volume, and minimum pressure for liquification.

Although there has been hereinabove described specific arrangements of atmospheric water extractor apparatus, and methods therefor for the purpose of illustrating the manner in which the present invention can be used to advantage, it should be appreciated that the invention is not limited thereto. Accordingly, any and all modifications, variations, or equivalent arrangements, which may occur to those skilled in the art, should be considered to be within the scope and spirit of the present invention as defined by the appended claims.

What is claimed is:

1. Water extractor apparatus comprising:

compressor means for compressing a refrigerant gas to a liquid;

evaporator means for evaporating refrigerant liquid to refrigerant gas and cooling an atmosphere adjacent the evaporator means;

condensing means for rejecting the heat of compression of hot refrigerant vapor to the atmosphere adjacent to the condenser;

chamber means, having a free-floating piston separating said chamber means into a first chamber and a second chamber, for alternately
   (1) condensing refrigerant gas in the first chamber and storing refrigerant liquid in the second chamber, and
   (2) condensing refrigerant gas in the second chamber and storing refrigerant liquid in the first chamber;

means, including lines interconnecting the compressor means, the evaporator means and the first and second chambers, for enabling the compressor means to alternately
   (a) introduce refrigerant gas into the first chamber and move refrigerant liquid into the evaporator means by displacement of the free-floating piston, and
   (b) introduce refrigerant gas into the second chamber and move refrigerant liquid into the evaporator means by reverse displacement of the free-floating piston;

means for cooling said chamber means; and means, including at least one reservoir, for collecting water condensing on the evaporator means from the adjacent atmosphere.

2. The water extractor apparatus according to claim 1 wherein the means for cooling said chamber means comprises fan means for passing the cooled atmosphere adjacent the evaporator means over the chamber means.

3. The water extractor apparatus according to claim 1 wherein the reservoir is removably attached to the apparatus.

4. The water extractor apparatus of claim 1 wherein the means for collecting further comprises a drain line disposed between the evaporator means and said reservoir, said drain line including means for directing condensed water into said reservoir in order to prevent excess evaporation and leakage of said condensed water.

5. The water extractor apparatus of claim 4 wherein the means for directing condensed water comprises a sloped annulus on an end of said drain line.

6. The water extractor apparatus of claim 1 further comprising means for conditioning water entering the reservoir by addition of at least one additive thereto.

7. The water extractor apparatus according to claim 6 wherein the means for conditioning includes a plurality of additives, and the means for conditioning includes means for enabling manual selection of at least one of the additives to be added to the water entering the reservoir.

8. The water extractor apparatus according to claim 1 further comprising sensor means for detecting a minimal level of water in the reservoir.

9. The water extractor apparatus according to claim 8 further including means for turning off the apparatus when said minimal level is detected by the sensor means.

10. The water extractor apparatus according to claim 9 wherein the sensor means is photoelectric.

11. A method of atmospheric water extraction comprising the steps of:

compressing a refrigerant gas to a liquid;

introducing the liquid into a first sealed chamber having as one wall thereof a hollow movable piston in order to compress refrigerant gas to a liquid in a second sealed chamber by movement of said movable piston;

withdrawing liquid compressed in the second chamber;

introducing the withdrawn liquid from the second chamber into an evaporator in order to vaporize the liquid from the second chamber;

compressing the vaporized refrigerant from the evaporator to a liquid;

introducing the liquid refrigerant gas into the second sealed chamber in order to compress refrigerant gas in the first sealed chamber by movement of the movable piston;

passing air cooled by evaporation of compressed refrigerant over the first and second chambers; and collecting water condensing on the evaporator from the adjacent atmosphere, into at least one reservoir.

12. The method according to claim 11 wherein the step of collecting water includes the step of removing the reservoir from the apparatus after the reservoir has been filled to a desired level.

13. The method according to claim 11 further including the step of conditioning the water entering the reservoir by the addition of at least one additive.

* * * * *